Dec. 25, 1962  R. C. DINSMORE  3,069,783
COMPASS
Filed June 27, 1960

INVENTOR.
ROBERT C. DINSMORE
BY
Barnes, Kisselle, Raisch & Choate
ATTORNEYS

United States Patent Office 3,069,783
Patented Dec. 25, 1962

3,069,783
COMPASS
Robert C. Dinsmore, Flint, Mich., assignor to Dinsmore Instrument Company, Flint, Mich., a corporation of Michigan
Filed June 27, 1960, Ser. No. 39,194
7 Claims. (Cl. 33—222)

This invention relates to a compass construction.

It is an object of the invention to provide a compass which in a sense is called a dry compass but which has all the advantages of a compass in which the card member is dampened by immersion in a fluid. The purpose of this immersion is to keep the compass from flopping around as it swings on a central axis and also to keep it from rotating rapidly so that it will quickly steady down to a designating position. This is particularly useful when the compasses are installed on vehicles.

With the floating or immersion construction, there is always a problem of sealing the liquid and also there is a problem of change of volume of the liquid or change of viscosity due to changes in temperature and also the danger of discoloration of the liquid which spoils the appearance and effectiveness of the compass.

To avoid this need for immersion, there have been attempts to provide a dry compass or what might be termed as "semi-dry compass" as shown in the disclosure of a patent to Watson 216,919 issued June 24, 1879. In this connection, a cylindrical, flanged shank of the compass was extended into a body of liquid which was trapped in a retaining well.

It is an object of the present invention to provide a fully damped compass in which the normal spindle and jewel assembly can be used. In combination with this assembly, I have discovered that the use of a highly viscous material in the neighborhood of 20,000 to 1,000,000 centistokes viscosity will, when placed in the recessed socket of the compass mounting pin, fully damp the compass against wobbling and swaying and also against rapid rotation. The viscosity of the material may vary depending on the size of the compass. The larger the compass dial, the greater the viscosity, although the degree of damping desired also determines the viscosity and shear strength of the fluid selected.

Figure 1:
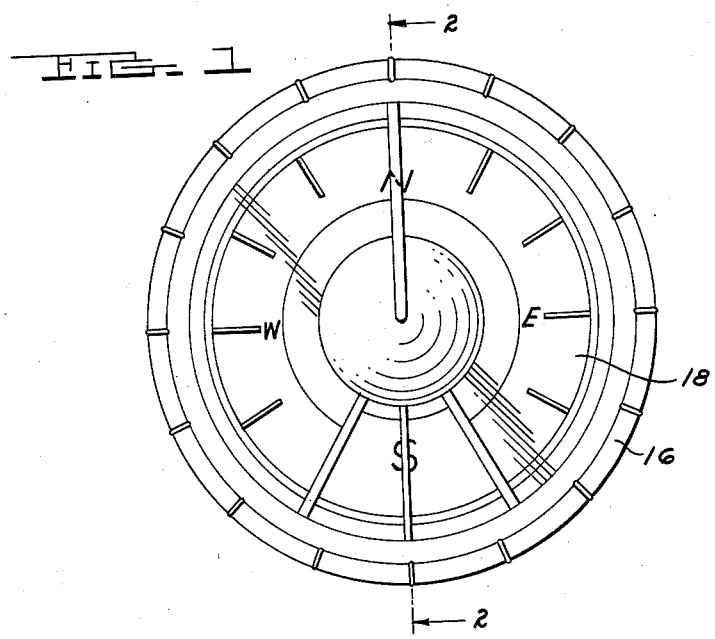
Figure 2:
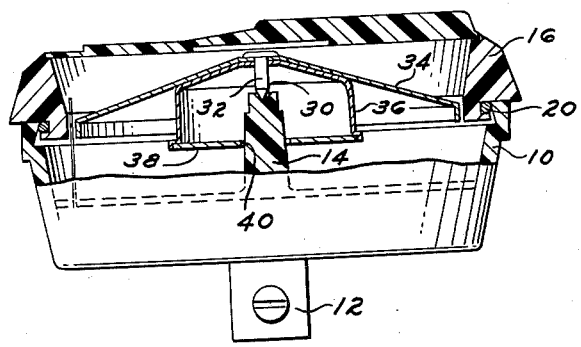
Figure 3:
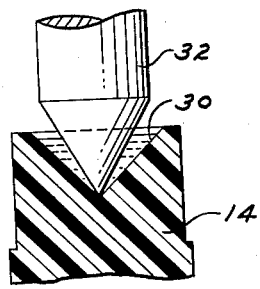

Other objects and features of the invention relating to details of construction and operation will be apparent in the following description and claims:

Drawings accompany the disclosure and the various views thereof may be briefly described as:

FIGURE 1, a plan view of the compass.
FIGURE 2, a sectional view of the compass.
FIGURE 3, an enlarged view of the compass mounting pin and bearing.

Referring to the drawings:

In FIGURES 1 and 2, a compass base housing 10 has a mounting bracket 12 and a central stem 14 projecting upwardly. The housing is closed by an annular plastic cover having a rim member 16 with a transparent center 18. The upper closure member is preferably held in place by a snap ring 20.

The central stem member 14 has an upper conical recess 30 which may have a jewel insert if desired. Supported in the recess 30 is a pointed mounting pin 32 mounted on a circular compass card 34 having suitable indicia printed thereon.

On a small bell housing or hanger 36, depending from the shell compass card 34, is mounted a circular magnetic element 38, provided with suitable poles to cause the compass to rotate in response to the earth's magnetic field. The disc 38 has a central aperture 40 to accommodate the central stem 14.

Contained in the conical recess 30 is a body of viscous material such as dimethylpolysiloxane. The material which has been found best suited to the purpose has had a viscosity range of 70,000 to 500,000 centistokes. For miniature compasses, it might be as low as 20,000 and for very large installations as high as 1,000,000 centistokes. The material has a flat viscosity-temperature curve, is an excellent lubricant and dielectric, and is relatively non-evaporative. The effect on the mounting pin is sufficient to dampen the entire motion of the compass card 34 in such a way that it acts in the same manner as if it were immersed in liquid. The high viscosity material in the cup or recess 30 will not run out under any normal tilting of the compass body. The shear strength of the material is such that it provides a side damping action as well as rotating damping action on the compass pin.

Since the material does not evaporate, it is practically permanent as a suitable damping medium acting only on the pin 32. There are no sealing problems in connection with the compass housing, and the action is practically constant within the temperature ranges in which human beings live.

It will thus be seen that by utilizing the effect of an extremely high viscosity material on a simple mounting pin of a compass, a highly desirable damping action can be obtained with no sealing problems. The compass dial or needle can run dry in air which makes possible a less expensive compass card and general housing construction.

I claim:

1. In combination, a magnetic compass comprising a housing having an upstanding central bearing stud with a top recess to serve as a mounting pin support, an enclosing wall on said housing having a transparent top, a compass card within said housing, a bell-like housing centrally of said compass card having walls depending from said card around and spaced from said stud, an annular magnet on said bell-like housing around said stud responsive to the earth's magnetic forces, a card mounting pin projecting into said recess and rotatable on a surface therein, and a quantity of control material in said recess surrounding and in surface contact with a portion of said pin in said recess, said control material comprising a silicone of extremely high shear strength with a viscosity of around 20,000 centistokes or more.

2. In a compass of the type having a magnet rotatably supported by means of an interengaged mounting pin and bearing, improved structure wherein said bearing comprises an open ended cup into which a portion of said mounting pin projects with its point engaging rotatably against a surface within the cup, said cup having a wall surface surrounding said mounting pin portion and forming a container, a body of damping fluid contained by said container in surface contact with said mounting pin, said body having a maximum volume which is substantially the volume of the interior of said container diminished by the displacement volume of said portion of said mounting pin, said body being disposed entirely within said container, said fluid having a viscosity of at least 20,000 centistokes.

3. The combination defined in claim 2 wherein said bearing comprises a stud having a recessed surface providing said cup, said cup, mounting pin, and magnet being enclosed in a housing whose interior is generally devoid of fluid having a substantial damping effect on said magnet except for said body of fluid.

4. The combination defined in claim 2 wherein a hanger is supported by said mounting pin and bearing, said magnet being suspended by said hanger at a location below the level of said cup.

5. The combination defined in claim 4 wherein a compass card is supported by said mounting pin and bearing, said hanger depending from said card to said location.

6. The combination defined in claim 4 wherein said hanger is bell shaped with walls substantially concentric around said stud, said magnet having generally circular shape with a central opening through which said stud projects.

7. The combination defined in claim 2 wherein said fluid comprises a silicone material.

References Cited in the file of this patent

UNITED STATES PATENTS

| | | |
|---|---|---|
| 2,375,329 | Sherrill | May 8, 1945 |
| 2,887,784 | Carter | May 26, 1959 |

FOREIGN PATENTS

| | | |
|---|---|---|
| 18,615 | Great Britain | Aug. 12, 1909 |
| 100,995 | Sweden | Mar. 4, 1941 |